US012572290B2

(12) United States Patent
Goodman et al.

(10) Patent No.: US 12,572,290 B2
(45) Date of Patent: Mar. 10, 2026

(54) MULTI-WRITER CENTRALIZED LOGGING STORAGE ARRAY

(71) Applicant: Huawei Cloud Computing Technologies Co., Ltd., Gui'an New District (CN)

(72) Inventors: Daniel Goodman, Hod Hasharon (IL); Amit Golander, Hod Hasharon (IL)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 93 days.

(21) Appl. No.: 18/745,745

(22) Filed: Jun. 17, 2024

(65) Prior Publication Data

US 2024/0419344 A1     Dec. 19, 2024

Related U.S. Application Data

(63) Continuation of application No. PCT/EP2021/086423, filed on Dec. 17, 2021.

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 10,223,184 B1 | 3/2019 | Mckelvie et al. | |
| 2010/0191922 A1* | 7/2010 | Dickey | ................... G06F 3/064 |
| | | | 711/E12.001 |
| 2020/0371913 A1* | 11/2020 | Dunham | ............. G06F 12/0895 |

* cited by examiner

*Primary Examiner* — Khoa D Doan
(74) *Attorney, Agent, or Firm* — Leydig, Voit & Mayer, Ltd.

(57) ABSTRACT

A storage array for centralized logging is provided. The storage array for centralized logging includes one or more servers and a near memory processing NMP module. The one or more servers are configured to host one or more allocation units allocated to a logical volume. The NMP module is configured for one or more allocation units, and the NMP module is configured to record and update a state of a respective allocation unit in a reserved area of the respective allocation unit. The state includes a virtual offset of the respective allocation unit within a virtual log and a range of valid data in the respective allocation unit, and the NMP module is configured to return the allocation unit state in response to a command from one of one or more client devices.

27 Claims, 9 Drawing Sheets

Virtual address

0 MB          997 MB          1995 MB    2555 MB

Virtual
Log
502

2 sealed AUs
1 partially filled
(Active)
Representing 2555
MB of log data

AU$_{0000}$
506A log_offset: 0
first_offset: 0
last_offset:
997MB
mode:
SEALED

AU$_{1000}$
506B log_offset: 997
first_offset: 0
last_offset:
998MB
mode:
SEALED

AU$_{2000}$
506C log_offset:
1995
first_offset: 0
last_offset:
560MB
mode:
ACTIVE 500
(Logical volume)

0 GB          1 GB          2 GB          3 GB

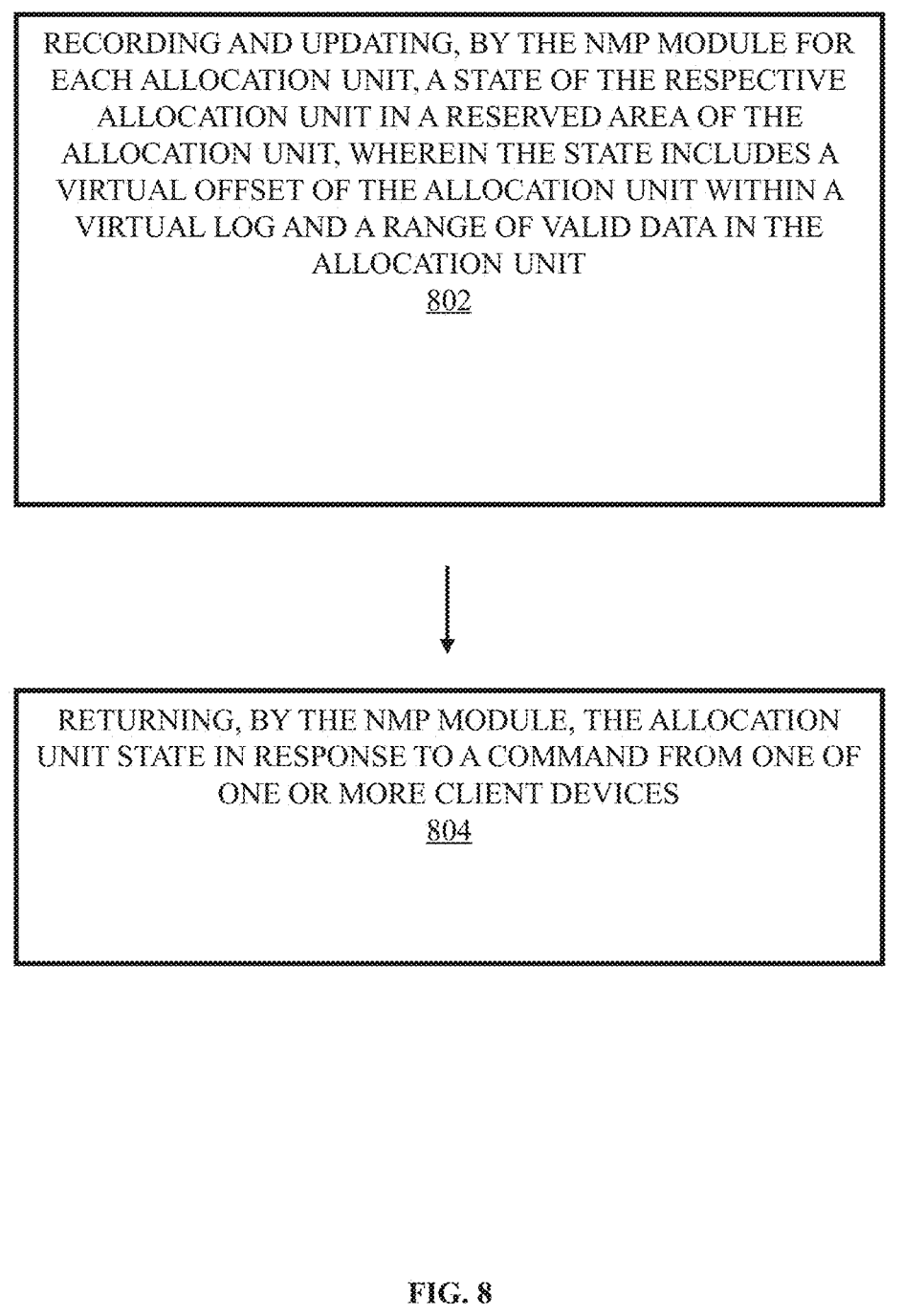

RECORDING AND UPDATING, BY THE NMP MODULE FOR EACH ALLOCATION UNIT, A STATE OF THE RESPECTIVE ALLOCATION UNIT IN A RESERVED AREA OF THE ALLOCATION UNIT, WHEREIN THE STATE INCLUDES A VIRTUAL OFFSET OF THE ALLOCATION UNIT WITHIN A VIRTUAL LOG AND A RANGE OF VALID DATA IN THE ALLOCATION UNIT
802

RETURNING, BY THE NMP MODULE, THE ALLOCATION UNIT STATE IN RESPONSE TO A COMMAND FROM ONE OF ONE OR MORE CLIENT DEVICES
804

FIG. 8

MULTI-WRITER CENTRALIZED LOGGING STORAGE ARRAY

CROSS-REFERENCE TO RELATED APPLICATIONS

This application is a continuation of International Application No. PCT/EP2021/086423, filed on Dec. 17, 2021, the disclosure of which is hereby incorporated by reference in its entirety.

TECHNICAL FIELD

The disclosure relates generally to logging facilities, and more particularly, the disclosure relates to a storage array for centralized logging. Moreover, the disclosure also relates to a client device that is arranged to communicate with the centralized logging storage array and a method of operating the centralized logging storage array.

BACKGROUND

The logging facilities/services, specifically Write Ahead Logs (WALs), are used by databases to implement ACID (atomicity, consistency, isolation, durability) operations. The WAL typically performs the rollback of incomplete transactions by temporally storing intermediate transaction data, in addition to enabling database replication and scalability. The WAL also supports append, read and truncate operations. During the append operation, the WAL adds data as a single entry to an end of the log. The append operation that is successful may return the address within the log of the start of the data. During the read operation, the WAL reads data back from the log (i.e. between 2 valid addresses). During the truncate operation, the WAL marks data in the log as read, i.e. the data may be discarded. In the case of multiple clients, once all clients have read the data a master will mark up to that address as truncated, and it is no longer possible to read at an offset before that address. The data are then processed up to a specific address from the head of the log and a physical storage can be freed for data up to that address.

Existing WAL employs a single writer or a fan-in architecture for writing logs; however, they do not support multiple concurrent writers to the same log as in both cases there can only be one writer at a time. Further, due to the single writer limitation, it is not possible to scale the write performance. Some existing WAL implementations also have a high latency (i.e. larger IO (Input/Output) size), which affects granularity and increases the resource requirements. Further, some existing WAL implementations have an inefficient storage (e.g. typically around 33% overhead) and may require additional network and server resources (e.g. metadata servers). Each additional resource adds complexity and cost and causes a fixed performance overhead due to additional network operations as well as resource contention. The technical complexity of the single writer in the existing WAL implementations is the requirement that log appends must be ordered and all log data must remain valid. For enabling multiple discrete writers, the existing WAL typically requires a high bandwidth gossip protocol between all write notes to ensure consistency and coordination, which in turn may lead to complex architectures and protocols. Current scalable architectures often have many layers, where each layer adds a fixed performance or latency cost. In addition, generic log services only provide limited functionality and are often limited in size, thus logging mechanisms are required to implement complicated resource managers which may lead to complexity as well as storage inefficiency, which when coupled with metadata stores etc. could add a 300% storage overhead.

Further, the single writer of the WAL implements all logic in a client, so that multiple processes and threads can write to the log in a coordinated manner and does not allow the other writers to write to log without any complex protocols to coordinate the writes. Alternatively, a fan-in architecture is a common network object that multiple clients can connect to in order to coordinate the writes; however, it only allows one writer at a time to update metadata and meet consistency requirements. Either with the single writer or the fan-in architecture, there are many layers that the log data must be processed through in order to eventually arrive at a storage medium and be replicated. The existing WAL having a single writer does not support Remote Direct Memory Access (RDMA) writes or reads.

Further, for each write and read operation, in the existing WAL, there are multiple network and processing steps from an application to a destination object-based storage device. This is a limitation as the metadata server has to update first to determine a correct location, and the data has to move to a correct node and a disk on that node. Each additional network or module traversal to the existing WAL adds a fixed cost to a round trip. Whether the existing WAL has the single writer or the fan-in architecture, the allocation and usage of log entities need to manage either in blocks or disk or log service. For example, some existing WALs that are currently available inefficiently manage hundreds of 64 megabytes (MB) elements to form a logging service. For example, each 64 MB element can take 96 MB of storage. The efficiency of this solutions is therefore <66% efficient and additional logs are required for writing metadata to ensure data consistency and reliability.

Generally, in order to improve the performance of databases, the databases have to be added with more servers. Currently, this can be performed with a single master multi-slave and a multi-master multi logs. In the single master multi-slave, a single master node accepts writes/ updates and writes to a single shared log. On completion of the transaction, the single master node publishes updates to slave nodes, which read updates from the shared log. The slave nodes can service read-only queries. However, the write performance of the single master multi-slave is still limited to a single node, which is a limiting factor, and a complex failover may happen. The multi-master multi-log has a significant cross node communication and coordination between nodes. Since the log mechanism cannot support multiple writers, there are multi-master nodes that can accept writes/update operations and can write to their own logs and then gets synchronized. The multi-master multi logs provide better performance in write-heavy scenarios; however, the multi-master multi logs have a high level of extremely complex coordination between logs to manage locks, updates, etc. The single writer forces each master to have his own complex log. The multi-master multi logs can work on different parts of the database at the same time, but every time one completes a transaction, it must be distributed to all the other masters. Each master needs to process the changes and determine whether to continue a transaction or roll back.

Therefore, there arises a need to address the aforementioned technical problem/draw backs in logging facilities in storage databases.

SUMMARY

The present disclosure provides a storage array for centralized logging, a client device arranged to communicate with the centralized logging storage array, and a method of operating the centralized logging storage array.

The disclosure provides a storage array for centralized logging, a client device arranged to communicate with the centralized logging storage array, and a method of operating the centralized logging storage array.

According to a first aspect, there is provided a storage array for centralized logging. The storage array for centralized logging includes a plurality of servers and a near memory processing (NMP) module. The plurality of servers is configured to host a plurality of allocation units allocated to a logical volume. The near memory processing. NMP, module is configured for each allocation unit, and each NMP module is configured to record and update a state of the respective allocation unit in a reserved area of the allocation unit. The state includes a virtual offset of the allocation unit within a virtual log and a range of valid data in the allocation unit, and the NMP module is configured to return the allocation unit state in response to a command from one of a plurality of client devices.

The storage array for centralized logging provides an improved performance of 30 μs for a write for an input-output (IO) of 4 to 8 kilobytes (KB) with 2 replicas. The storage array has an improved performance of 6 μs for a read for an IO of 8 KB. The storage array has a storage efficiency of up to 99.8%. The storage array distributes the state that is shared in the allocation units and eliminates the need for replication, thereby simplifying the management of logs and error recovery. The storage array has a low latency (e.g. less than 30 μs) which append times that enables new database architectures that do not require large buffers for IO caching. The storage array further eliminates the need for communication between clients, metadata servers, etc. The storage array is easy to detect, and it does not require a centralized metadata server and a true multi-writer, i.e. it provides a full concurrent operation with multiple concurrent writers and no blocking (e.g. as in a fan-in solution). The storage array further determines a storage overhead, etc. The storage array rebuilds an individual allocation unit that is failed without affecting its overall state or performance. The storage array has a short path that includes a single network path and a replica overhead. The storage array is simple as it has no resource management overhead (e.g. multiple files, metadata servers, etc.) and can be encapsulated within a single logical volume.

Optionally, the NMP module is configured to update the state of the respective allocation unit in the reserved area using a cache line aligned write operation. The state of each allocation unit may include a start offset of the allocation unit in the virtual log, a first valid offset indicating a first valid byte if the allocation unit is truncated, a last valid offset indicating a last byte written to, and a mode of the allocation unit. Optionally, the mode is one of uninitialized, active, sealing, sealed, or deleted.

The NMP module may be configured to respond to an append request received from one of the plurality of client devices by: (i) determining an expected final write offset for the payload based on the allocation unit state and a payload size; (ii) writing the payload to the allocation unit; (iii) updating the state of the respective allocation unit in the reserved area of the allocation unit; and (iv) sending an updated state of the allocation unit to the client device.

Optionally, the NMP module is further configured to replicate the payload to one or more secondary data servers and wait for a confirmation of the replication before writing the payload to the allocation unit.

Optionally, the NMP module is further configured to determine whether the payload size is small or large, based on a predetermined threshold. For a small payload, the expected final write offset is determined before the payload is replicated, and for a large payload, the payload is replicated before the final write offset is determined.

Optionally, the updated state of the allocation unit includes the final write offset for the payload, and the NMP module is configured to ensure that any data written up to the final write offset is valid before sending the updated state to the client device.

According to a second aspect, there is provided a client device arranged to communicate with a centralized logging storage array which includes a plurality of servers configured to host a plurality of allocation units allocated to a logical volume. The client device is configured to maintain a state map including a state for one or more allocation units allocated to the logical volume. The state includes a virtual offset of the allocation unit within a virtual log and a range of valid data in the allocation unit.

The storage array for centralized logging provides an improved performance of 30 μs for a write for an IO of 4 to 8 KB with 2 replicas. The storage array has an improved performance (e.g. 30 times performance improvement) of 6 μs for a read for an IO of 64 KB. The storage array has a storage efficiency of up to 99.8%. The storage array distributes the state that is shared in the allocation units and eliminates the need for replication, thereby simplifying the management of logs and error recovery. The storage array is easy to detect, and it does not require a centralized metadata server and a true multi-writer, i.e. it provides a full concurrent operation with multiple concurrent writers and no blocking (e.g. as in a fan-in solution).

Optionally, the client device is further configured to maintain a client library including a logical volume address in the storage array for each allocation unit, a storage node address corresponding to the allocation unit, and a corresponding Remote Direct Memory Access (RDMA) address within the storage node. In some examples, the RDMA address may be an RDMA over converged ethernet (ROCE) address. The client device is further configured to read data from a virtual address in the virtual log by: (i) determining a logical volume address in the storage array for the virtual address in the virtual log; (ii) determining a storage node address and a RDMA address within the storage node corresponding to the logical volume address; and (iii) sending an RDMA read command to the RDMA address.

Optionally, the client device is further configured to determine the address in the storage array for the virtual address in the virtual log, by looking up the virtual offset for each allocation unit in the state map, determining an offset for the virtual address within the allocation unit and mapping the offset to an address in the storage array based on the client library.

The client device may be configured to append a payload to the virtual log by: (i) determining a current active allocation unit from the state map; and (ii) sending an append request for the payload including the payload size to a near memory processing. NMP, module corresponding to the current active allocation unit.

According to a third aspect, there is provided a method of operating a centralized logging storage array which includes a plurality of servers configured to host a plurality of allocation units allocated to a logical volume, and a near memory processing. NMP, module associated with one or more of the plurality of allocation units. The method includes recording and updating, by the NMP module for each allocation unit, a state of the respective allocation unit in a reserved area of the allocation unit, wherein the state includes a virtual offset of the allocation unit within a virtual log and a range of valid data in the allocation unit. The method includes returning, by the NMP module, the allocation unit state in response to a command from one of a plurality of client devices.

The method provides an improved performance of 30 µs for a write for an IO of 4 to 8 KB with 2 replicas. The method provides an improved performance of 6 µs for a read for an IO of 8 KB. The storage array has a storage efficiency of up to 99.8%. The method distributes the state that is shared in the allocation units and eliminates the need for replication, thereby simplifying the management of logs and error recovery.

Optionally, updating the state of the respective allocation unit in the reserved area includes using a cache line aligned write operation. Optionally, the state of each allocation unit includes a start offset of the allocation unit in the virtual log, a first valid offset indicating a first valid byte if the allocation unit is truncated, a last valid offset indicating a last byte written to, and a mode of the allocation unit. Optionally, the mode is one of uninitialized, active, sealing, sealed, or deleted.

Optionally, the method further includes responding, by the NMP module, to an append request received from one of the plurality of client devices by: (i) determining an expected final write offset for the payload based on the allocation unit state and a payload size; (ii) writing the payload to the allocation unit; (iii) updating the state of the respective allocation unit in the reserved area of the allocation unit; and (iv) sending an updated state of the allocation unit to the client device. In some examples, updating the states may use an extended Asynchronous DRAM Refresh mechanism (eADR), eADR can ensures that, during a power loss, all pending writes are written. In addition, eADR can act like a cache such that, when an additional refresh arrives, the latest sent version will be written without damaging the underlying memory.

Optionally, the method further includes replicating, by the NMP module, the payload to one or more secondary data servers, and waiting for a confirmation of the replication before writing the payload to the allocation unit.

Optionally, the method further includes determining, by the NMP module, whether the payload size is small or large, based on a predetermined threshold. For a small payload, the expected final write offset is determined before the payload is replicated, and for a large payload, the payload is replicated before the final write offset is determined.

The updated state of the allocation unit may include the final write offset for the payload. The method further includes ensuring, by the NMP module, that any data written up to the final write offset is valid before sending the updated state to the client device.

Optionally, the method further includes maintaining, by a client device arranged to communicate with the centralized logging storage array, a state map including the state for each allocation unit allocated to the logical volume. Optionally, the method further includes maintaining, by the client device, a client library including a logical volume address in the storage array for each allocation unit, a storage node address corresponding to the allocation unit, and a corresponding RDMA address within the storage node.

Optionally, the method further includes reading, by the client device, data from a virtual address in the virtual log by: (i) determining a logical volume address in the storage array for the virtual address in the virtual log; (ii) determining a storage node address and a RDMA address within the storage node corresponding to the logical volume address; and (iii) sending an RDMA read command to the RDMA address.

Optionally, the method further includes determining, by the client device, the address in the storage array for the virtual address in the virtual log, by looking up the virtual offset for each allocation unit in the state map, determining an offset for the virtual address within the allocation unit and mapping the offset to an address in the storage array based on the client library.

Optionally, the method further includes appending, by the client device, a payload to the virtual log by: (i) determining a current active allocation unit from the state map; and (ii) sending an append request for the payload including the payload size to the NMP module corresponding to the current active allocation unit.

According to a fourth aspect, there is provided a computer-readable medium comprising instructions which, when executed by a processor, cause the processor to perform the above method.

Therefore, according to the storage array for centralized logging, the client device arranged to communicate with the centralized logging storage array and the method of operating the centralized logging storage array, the storage array for centralized logging provides an improved performance of 30 µs for a write for an IO of 4 to 8 KB with 2 replicas. The storage array has an improved performance of 6 µs for a read for an IO of 64 KB. The storage array has a storage efficiency of up to 99.8%. The storage array distributes the state that is shared in the allocation units and eliminates the need for replication, thereby simplifying the management of logs and error recovery. The storage array has a low latency (e.g. less than 30) which append times that enables new database architectures that do not require large buffers for IO caching. The storage array further eliminates the need for communication between clients, metadata servers, etc.

These and other aspects of the disclosure will be apparent from and the implementation(s) described below.

BRIEF DESCRIPTION OF DRAWINGS

Implementations of the disclosure will now be described, by way of example only, with reference to the accompanying drawings, in which:

FIG. 8 is a flow diagram that illustrates a method of operating a centralized logging storage array in accordance with an implementation of the disclosure.

DETAILED DESCRIPTION OF THE DRAWINGS

Implementations of the disclosure provide a storage array for centralized logging. The disclosure also provides a client device arranged to communicate with the centralized logging storage array and a method of operating the centralized logging storage array.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
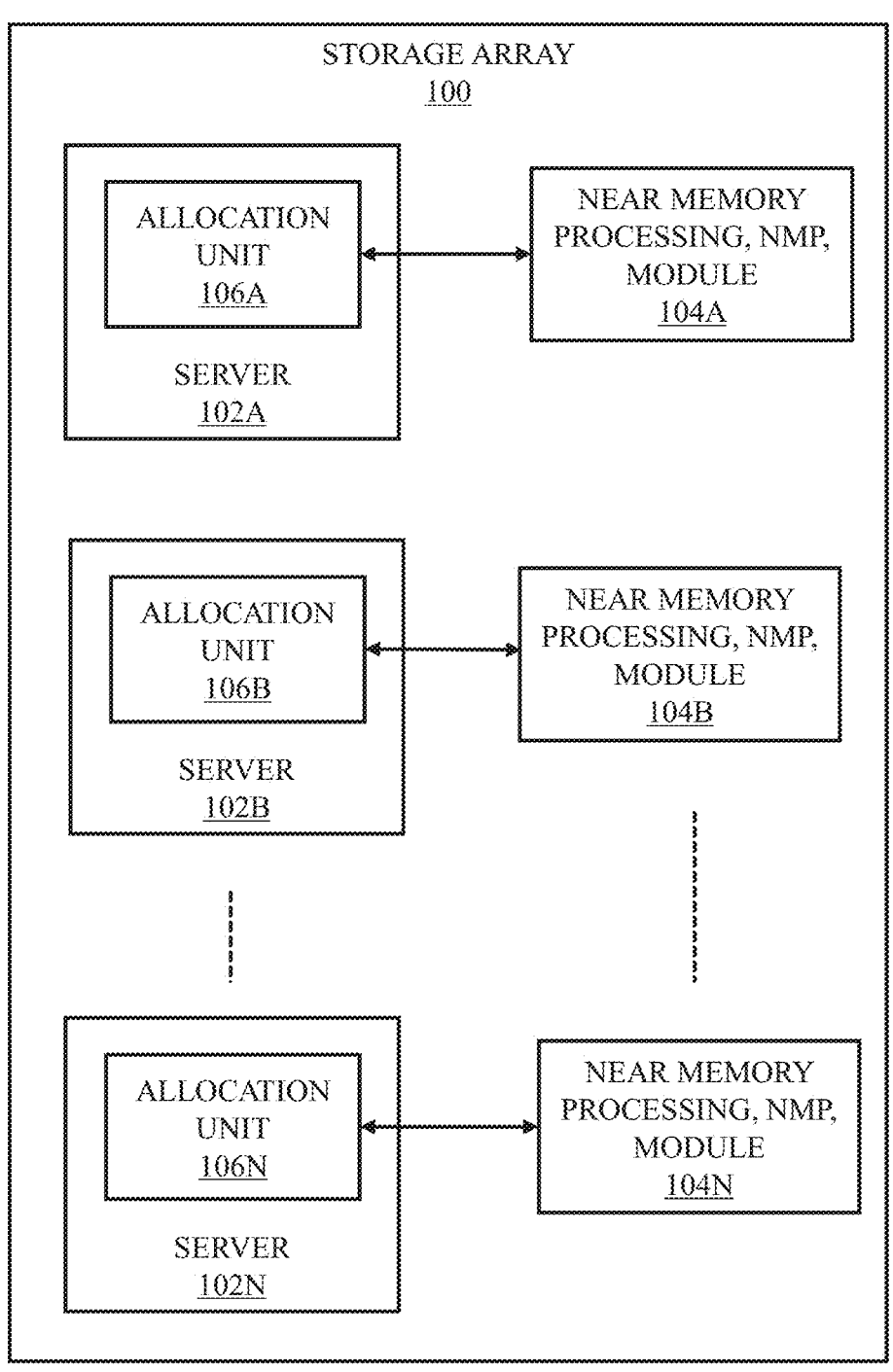
FIG. 1 is a block diagram of a storage array for centralized logging in accordance with an implementation of the disclosure.

FIG. 1 is a block diagram of a storage array 100 for centralized logging in accordance with an implementation of the disclosure. The storage array 100 for centralized logging includes one or more servers 102A-N and one or more near memory processing. NMP, module 104A-N. The one or more servers 102A-N are configured to host one or more allocation units 106A-N allocated to a logical volume. Each near memory processing. NMP, module 104A-N is configured for each allocation unit 106A-N. Each NMP module 104A-N is configured to record and update a state of the respective allocation unit 106A-N in a reserved area of the allocation unit 106A-N. The state includes a virtual offset of the allocation unit 106A-N within a virtual log and a range of valid data in the allocation unit 106A-N, and the NMP module 104A-N is configured to return the allocation unit state in response to a command from one of one or more client devices. Optionally, all data in the virtual log up to the virtual log is valid data (i.e. no holes/spaces between data entries and the contents of the data entry is a whole payload).

The storage array 100 for centralized logging provides an improved performance of 30 µs for a write for an input-output (IO) of 4 to 8 kilobytes (KB) with 2 replicas. The storage array 100 has an improved performance of 6 µs for a read for an IO of 64 KB. The storage array 100 has a storage efficiency of up to 99.8%. The storage array 100 distributes the state that is shared in the allocation units 106A-N and eliminates the need for replication, thereby simplifying the management of logs and error recovery. The storage array 100 has a low latency (e.g. less than 30 µs) which append times that enables new database architectures that do not require large buffers for IO caching. The storage array 100 further eliminates the need for communication between clients, metadata servers, etc. The storage array 100 is easy to detect and it does not require a centralized metadata server and a true multi-writer, i.e. it provides a full concurrent operation with multiple concurrent writers and no blocking (e.g. as in a fan-in solution).

The storage array 100 further determines a storage overhead, etc. Optionally, the storage array 100 rebuilds an individual allocation unit that is failed without affecting its overall state or performance. The storage array 100 has a short path that includes a single network path and a replica overhead. The storage array 100 is simple as it has no resource management overhead (e.g. multiple files, metadata servers, etc.) and can be encapsulated within a single logical volume.

The storage array 100 has an improved performance as it has a payload size asymmetry. For example, if one client device sends 2 MB and then shortly after 4 KB, then the storage array 100 may not wait for the 2 MB to finish before processing the 4 KB, so the 4 KB may be inserted into the log before the 2 MB as 2 MB can take substantially longer.

Optionally, the NMP module 104A-N is configured to update the state of the respective allocation unit 106A-N in the reserved area using a cache line aligned write operation. The state of each allocation unit 106A-N may include a start offset of the allocation unit 106A-N in the virtual log, a first valid offset indicating a first valid byte if the allocation unit 106A-N is truncated, a last valid offset indicating a last byte written to, and a mode of the allocation unit 106A-N. Optionally, the mode is one of uninitialized, active, sealing, sealed, or deleted.

In some embodiments, if all the data in the allocation unit 106A-N is truncated, the NMP module 104A-N may be configured to update the state of the respective allocation unit 106A-N to be uninitialized, i.e. allocation unit 106A-N may be returned to a pool of free allocation units. In this way, space efficiency can be improved, by only using allocation units with valid data on them.

The NMP module (e.g. 104A) may be configured to respond to an append request received from one of the one or more client devices by: (i) determining an expected final write offset for the payload based on the allocation unit state and a payload size; (ii) writing the payload to the allocation unit (e.g. 106A); (iii) updating the state of the respective allocation unit 106A in the reserved area of the allocation unit 106A; and (iv) sending an updated state of the allocation unit 106A to the client device. Optionally, the NMP module 104A completely writes all the payload as a single entry (i.e. the payload cannot be split) to the allocation unit 106A in the virtual log upon the append request is received from one of the one or more client devices. Optionally, the virtual offset of the allocation unit 106A in the virtual log is returned to the client device on successful completion of the append request. Optionally, all data up to and including the virtual offset is valid data.

If the client device disappears/fails at any stage, the entry may be written to the virtual log as long as the virtual log maintains consistency. Optionally, when the client device sends an append request, in the case of a network congestion or connection issues, to fail at the client device quickly and allow the application to retry, then the client device waits for an operation to fail/succeed or retry/resend the append request over the network. The client device may fail even if the valid data is eventually written to the virtual log.

Optionally, the NMP module 104A is further configured to replicate the payload to one or more secondary data servers, and wait for a confirmation of the replication before writing the payload to the allocation unit 106A. In some examples, the NMP module 104A may be configured to replicate an update payload representing one or more changes to be made by the received payload.

Optionally, the NMP module 104A is further configured to determine whether the payload size is small or large, based on a predetermined threshold. For a small payload, the expected final write offset is determined before the payload is replicated, and for a large payload, the payload is replicated before the final write offset is determined. In some examples, the NMP module 104A may be configured to determine the predetermined threshold dynamically based on, for example, an expected time to replicate to payload, or an expected number of smaller appends could be completed before complete replication of the payload (i.e. a number of appends that are blocked waiting for the payload. In some examples, the NMP module 104A may be configured to determine predetermined threshold based at least in part on a state of a replication queue between the 2 nodes, for example, even for a small payload it may be beneficial to wait before the final write offset is determined if there is a backlog, this may add to the time taken to append the payload, but can free up the backlog.

Optionally, the updated state of the allocation unit 106A includes the final write offsets for the payload, and the NMP module 104A is configured to ensure that any data written up to the final write offset is valid before sending the updated state to the client device.

Figure 2:
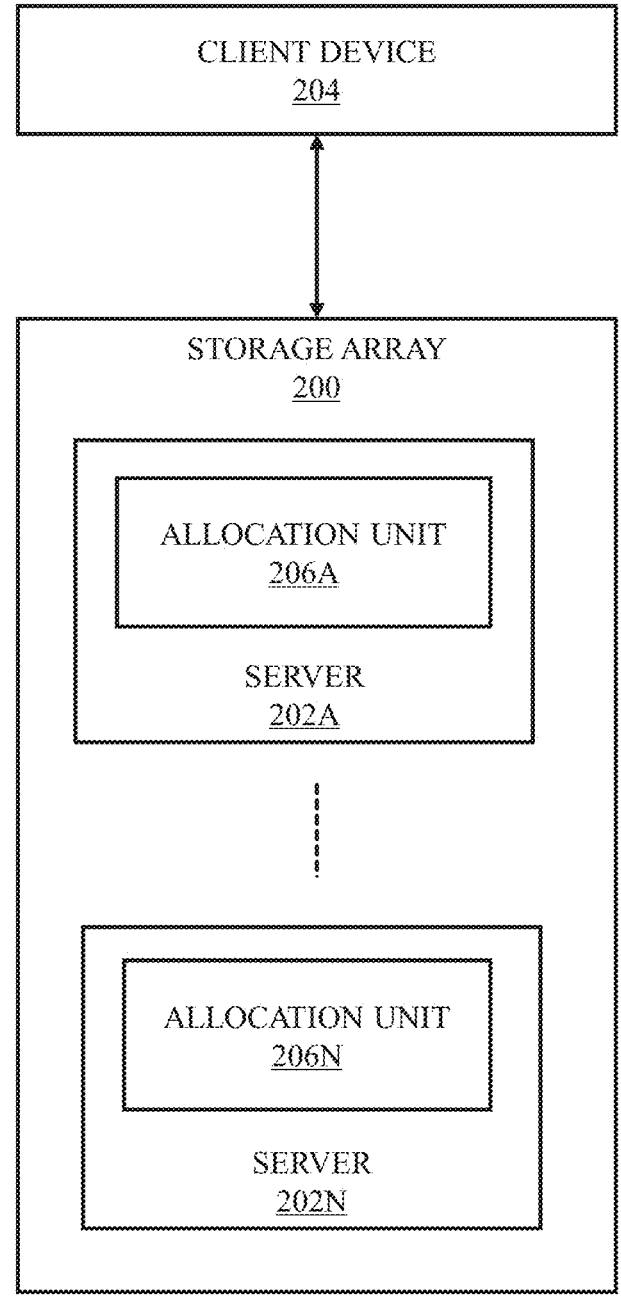
FIG. 2 is a block diagram of a client device that is arranged to communicate with a storage array in accordance with an implementation of the disclosure.

FIG. 2 is a block diagram of a client device 204 that is arranged to communicate with a storage array 200 in accordance with an implementation of the disclosure. The client device 204 is arranged to communicate with the storage array 200. The storage array 200 includes one or more servers 202A-N. The one or more servers 202A-N are configured to host one or more allocation units 206A-N allocated to a logical volume. The client device 204 is configured to maintain a state map including a state for one or more allocation units 206A-N allocated to the logical volume. For example, the state map may include a state for each allocation unit with valid data. In some examples, the state map may not include a state for any truncated allocation unit and any allocation unit beyond the active allocation unit. The state includes a virtual offset of the allocation unit 206A-N within a virtual log and a range of valid data in the allocation unit 206A-N.

In some embodiments, if all the data in the allocation unit 206A-N is truncated, the state of the respective allocation unit 206A-N may be updated to be uninitialized, i.e. the allocation unit 206A-N may be returned to a pool of free allocation units. In this way, space efficiency can be improved, by only using allocation units with valid data on them.

Optionally, the client device 204 is further configured to maintain a client library including a logical volume address in the storage array 200 for each allocation unit 206A-N, a storage node address corresponding to the allocation unit, and a corresponding remote direct memory access. RDMA, address within the storage node. The client library (e.g. pmAddr) may include an allocation table that includes all the allocation units 206A-N allocated to the logical volume, the primary and secondary internet protocols (IPs) of the storage array 200 where the allocation units 206A-N exist and their physical addresses.

The client device 204 is further configured to read data from a virtual address in the virtual log by: (i) determining a logical volume address in the storage array 200 for the virtual address in the virtual log; (ii) determining a storage node address and a RDMA address within the storage node corresponding to the logical volume address; and (iii) sending an RDMA read command to the RDMA address.

Optionally, the client device 204 is further configured to determine the address in the storage array 200 for the virtual address in the virtual log, by looking up the virtual offset for each allocation unit 206A-N in the state map, determining an offset for the virtual address within the allocation unit 206A-N and mapping the offset to an address in the storage array 200 based on the client library.

The client device 204 may be configured to append a payload to the virtual log by determining a current active allocation unit from the state map and sending an append request for the payload including the payload size to a near memory processing. NMP, module corresponding to the current active allocation unit 206A-N.

Optionally, the client device 204 adds a logging client (e.g. pmWAL). The logging client may create the logical volume, and map the allocation units (AUS) 206A-N (e.g. 1 gigabyte. GB) to the addresses in the virtual log. Optionally, the NMP module for each allocation unit 206A-N that accepts append requests handles the replication of each append payload, determines the final append address for each payload, and returns the address to the logging client.

Figure 3:
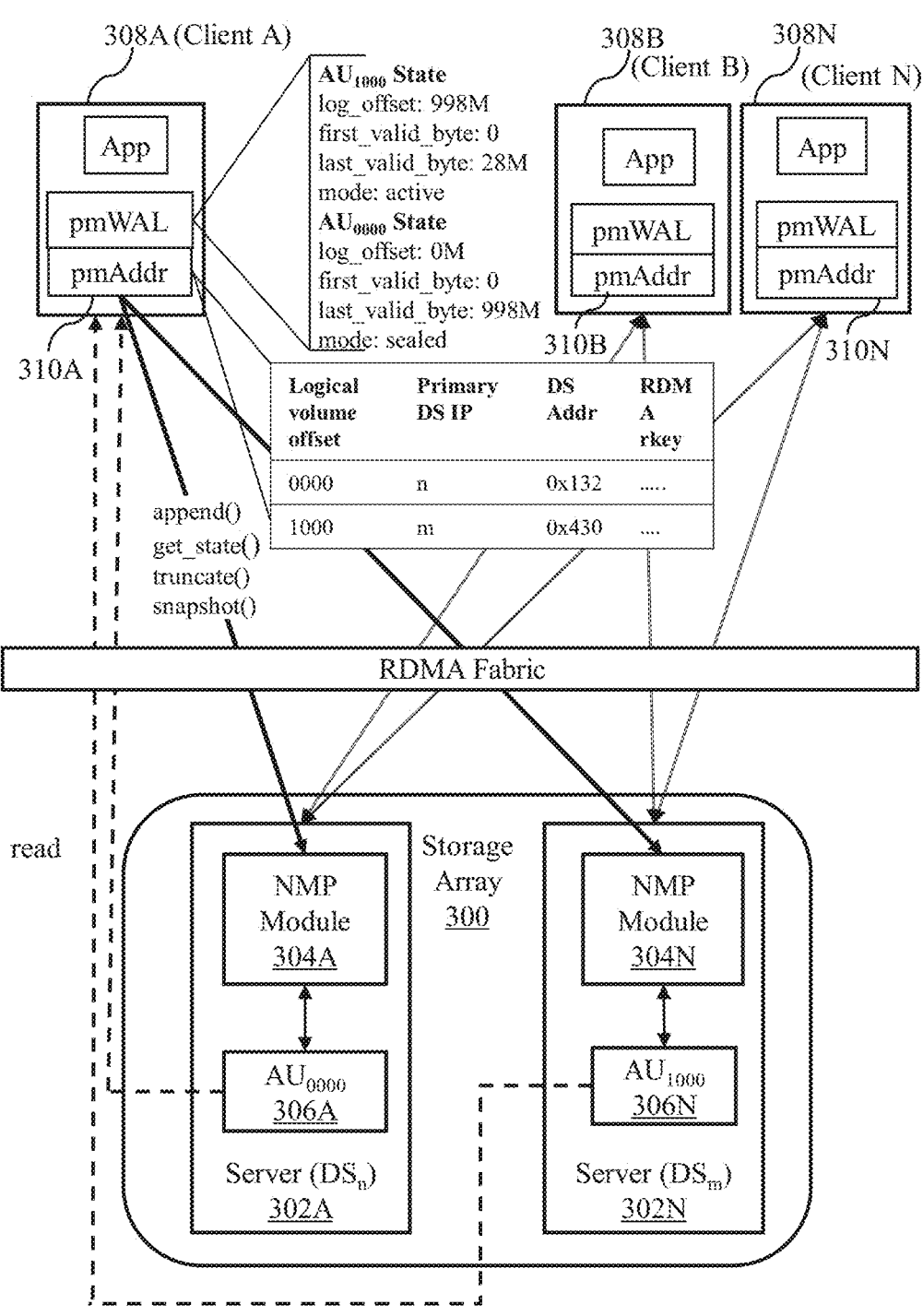
FIG. 3 is an exploded view of a storage array that is arranged to communicate with one or more client devices in accordance with an implementation of the disclosure.

FIG. 3 is an exploded view of a storage array 300 that is arranged to communicate with one or more client devices 308A-N in accordance with an implementation of the disclosure. The storage array 300 includes one or more servers (e.g. $DS_n$-$DS_m$) 302A-N and one or more near memory processing. NMP, modules 304A-N. The one or more servers 302A-N are configured to host one or more allocation units 306A-N allocated to a logical volume. The one or more NMP modules 304A-N are configured for each allocation unit (AU) 306A-N (e.g. $AU_{0000}$-$AU_{1000}$). Each NMP module 304A-N is configured to record and update a state of the respective allocation unit 306A-N in a reserved area of the allocation unit 306A-N. Optionally, the logical volume is used to represent a space of a virtual log address. The one or more client devices 308A-N may easily map the virtual log address to a physical address in the logical volume down to host and offset within a persistent memory (PM) storage.

Optionally, each allocation unit, AU, 306A-N (e.g. AU with 1 GB, in size) is allocated to the logical volume that maintains its own state (i.e. not a global state). The state of the AUs 306A-N is independent (i.e. no shared state) and there is no communication/IO between the AUs 306A-N. The updated state of each AU 306A-N may be shared with the respective client devices 308A-N. The storage array 300 distributes the state that is shared in the one or more allocation units 306A-N and eliminates the need for replication, thereby simplifying the management of logs and error recovery.

The one or more NMP modules 304A-N are configured to handle appends to the one or more allocation units 306A-N. Each NMP module 304A-N is allocated to each allocation unit 306A-N to handle all appends through the logical volume. The NMP module (e.g. 304A) may be configured to respond to an append request received from one of the one or more client devices 308A-N by (i) determining an expected final write offset for the payload based on the allocation unit state and a payload size, (ii) writing the payload to the allocation unit 306A, (iii) updating the state of the respective allocation unit 306A in the reserved area of the allocation unit 306A, and (iv) sending an updated state of the allocation unit 306 to the client device 308A. The one or more NMP modules 304A-N may order all concurrent appends, maintain data consistency and validity, and determine an offset for each append. Optionally, the one or more NMP modules 304A-N are configured to ensure that any data written up to a final write offset is valid before sending an updated state to the one or more client devices 308A-N (i.e. the client device only obtains a response with a virtual offset once all data up to the virtual offset is valid). The one or more NMP modules 304A-N may return an updated state (i.e. a latest state) of the allocation units (i.e. au_state) 306A-N with each command response to the one or more client devices 308A-N. When the AU 306A is full, the NMP modules 304A may complete the outstanding appends orderly, provide the client device 308A to move to a next AU 306B, and provide needed information to be supplied by the next AU 306B. The one or more NMP modules 304A-N constantly serialize the state of the AUs 306A-N into the reserved area of the respective AUs 306A-N (e.g. AUs with 2 MB).

Optionally, the one or more NMP modules 304A-N are further configured to replicate the payload to one or more secondary data servers, and wait for a confirmation of the replication before writing a payload to the allocation unit 306A-N. In some examples, the one or more NMP modules 304A-N may be configured to replicate an update payload representing one or more changes to be made by the received payload.

Optionally, the one or more NMP modules 304A-N are further configured to determine whether the payload size is small or large, based on a predetermined threshold. For a small payload, the expected final write offset is determined before the payload is replicated, and for a large payload, the payload is replicated before the final write offset is determined. In some examples, the NMP modules 304A-N may be configured to determine the predetermined threshold dynamically based on, for example, an expected time to replicate to payload, or an expected number of smaller appends could be completed before complete replication of the payload (i.e. a number of appends that are blocked waiting for the payload. In some examples, NMP modules 304A-N may be configured to determine predetermined threshold based at least in part on a state of a replication queue between the 2 nodes, for example, even for a small payload it may be beneficial to wait before the final write offset is determined if there is a backlog, this may add to the time taken to append the payload, but can free up the backlog.

Optionally, the one or more NMP modules 304A-N attempt to determine an optimistic address of the payload before it is replicated. For example, for up to a specific size or for a small payload, the optimistic address is a final write offset or a final address, and for larger payloads, it may be the optimistic address). In case of a payload size asymmetry, the plurality of one or more NMP modules 304A-N may update the final write offset if the NMP modules 304A-N complete the replication before another payload and update the address of the replicated payloads before they are flushed from the replication log to the storage array 300. Optionally, the storage array 300 is a centralized logging storage array.

Optionally, the one or more client devices 308A-N (e.g. a client A, a client B, a client N, etc.) are arranged to communicate with the storage array 300. The one or more client devices 308A-N are configured to maintain a state map including a state for one or more allocation units 306A-N allocated to the logical volume. For example, the state map may include a state for each allocation unit with valid data. In some examples, the state map may not include a state for any truncated allocation unit and any allocation unit beyond the active allocation unit. The state includes a virtual offset of the allocation unit 306A-N within a virtual log and a range of valid data in the allocation unit 306A-N. Each allocation unit (AU) 306A-N may represent a contiguous window into the virtual address space of the virtual log. The AU 306A-N may not be 100% full due to the dynamic payload size and metadata or the state. The one or more NMP modules 304A-N are configured to return the state of each allocation unit 306A-N in response to a command from one of the one or more client devices 308A-N.

In some embodiments, if all the data in the allocation unit 306A-N is truncated, the state of the respective allocation unit 306A-N may be updated to be uninitialized, i.e. the allocation unit 306A-N may be returned to a pool of free allocation units. In this way, space efficiency can be improved, by only using allocation units with valid data on them.

Optionally, the one or more client devices 308A-N are further configured to maintain a client library (e.g. pmAddr 310A-N) including a logical volume address in the storage array 300 for each allocation unit 306A-N, a storage node address corresponding to the allocation unit, and a corresponding remote direct memory access. RDMA, address within the storage node.

Optionally, the one or more client devices 308A-N are further configured to determine the address in the storage array 300 for the virtual address in the virtual log, by looking up the virtual offset for each allocation unit 306A-N in the state map, determining an offset for the virtual address within the allocation unit 306A-N and mapping the offset to an address in the storage array 300 based on the client library 310A-N.

Optionally, the one or more client devices 308A-N are further configured to read data from a virtual address in the virtual log by (i) determining a logical volume address in the storage array 300 for the virtual address in the virtual log, (ii) determining a storage node address and a RDMA address within the storage node corresponding to the logical volume address, and (iii) sending an RDMA read command to the RDMA address. The one or more client devices 308A-N may use the client library (e.g. 310A-N) to determine which server 302A-N/NMP module 304A-N to send the command to, and the RDMA address locally without redirecting through management server. The one or more client devices 308A-N have an improved read performance, as the client devices 308A-N know the state of the AU 306A-N, and can read data directly from the AU in a single RDMA operation. Optionally, the RDMA operation may include append( ), get_state( ), truncate( ), and snapshot( ).

In an example, if the client AU cache is updated using get_state( ), the command for each AU is executed as follows:

PmWAL.read(start_addr, length)
  1. Map the log address to a logical volume address
    1. Look up AU that has matching address i.e.
      log_offset<=start_addr<=log_offset+last_offset
    2. Calculate au_offset=start_addr−log_offset
    3. Determine if within one AU test length<last_offset−au_offset
      If false, repeat for all AUs in the range
    4. Convert to vpm_start_addr=au_addr+au_offset
  II. Send RDMA read via pmAddr: read (vpm_start_addr, length, buffer)
  III. Return buffer to an application Optionally, the entire operation is completed in a single remote direct memory access, RDMA, operation.

Figure 4:
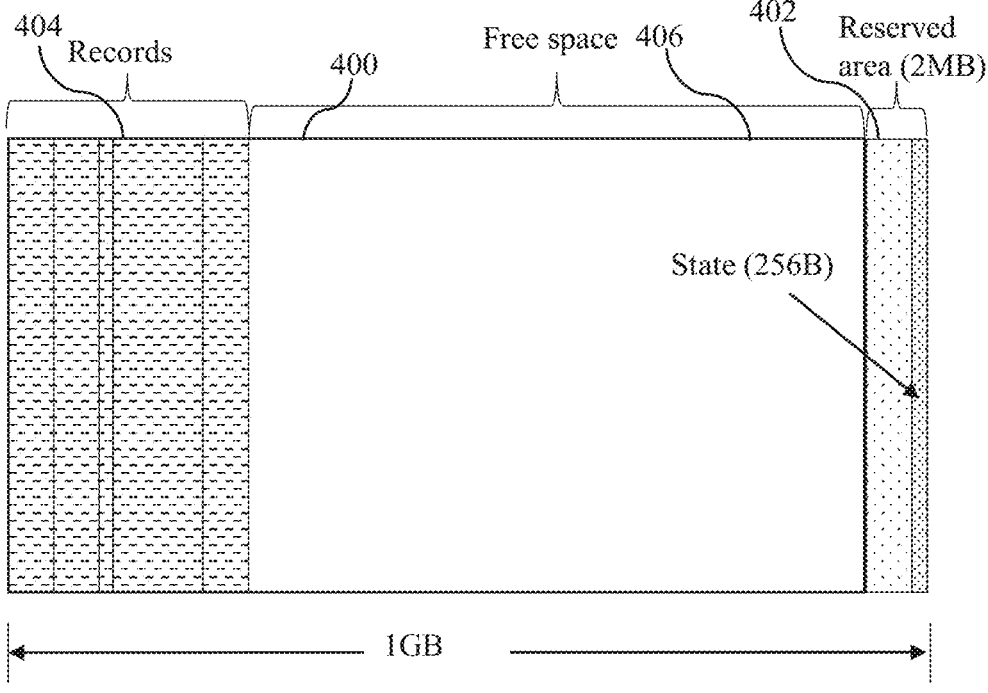
FIG. 4 is an exemplary illustration of an allocation unit (AU) in accordance with an implementation of the disclosure.

FIG. 4 is an exemplary illustration of an allocation unit (AU) 400 in accordance with an implementation of the disclosure. The allocation unit 400 is allocated to a logical volume. The allocation unit 400 (e.g. 1 GB in size) in the logic volume has an independent state (e.g. 256 bytes, B, in size). One or more servers are configured to host the allocation units allocated to the logical volume. A near memory processing, NMP, module is configured for the allocation unit 400. The NMP module is configured to record and update the state of the allocation unit 400 in a reserved area (e.g. last 2 MB) 402 of the allocation unit 400. The state includes a virtual offset of the allocation unit 400 within a virtual log and a range of valid data in the allocation unit 400, and the NMP module is configured to return the allocation unit state in response to a command from one of one or more client devices. Optionally, the allocation unit 400 may include an area with records 404, and a free space 406. The reserved area 402 may be kept for growth and to store additional data such as snapshots, etc.

Optionally, the NMP module is configured to update the state of a respective allocation unit 400 in the reserved area 402 using a cache line aligned write operation. The state of each allocation unit 400 may include a start offset of the allocation unit 400 in the virtual log (e.g. a log_logical_offset), a first valid offset indicating a first valid byte if the allocation unit 400 is truncated (e.g. a first_valid_offset), a last valid offset indicating a last byte written to, and a mode of the allocation unit 400.

In some embodiments, if all the data in the allocation unit 400 is truncated, the state of the respective allocation unit 400 may be updated to be uninitialized, i.e. the allocation unit 400 may be returned to a pool of free allocation units. In this way, space efficiency can be improved, by only using allocation units with valid data on them. In addition, the client needs to store less state information.

Optionally, the mode is one of uninitialized, active, sealing, sealed, or deleted.

Figure 5:
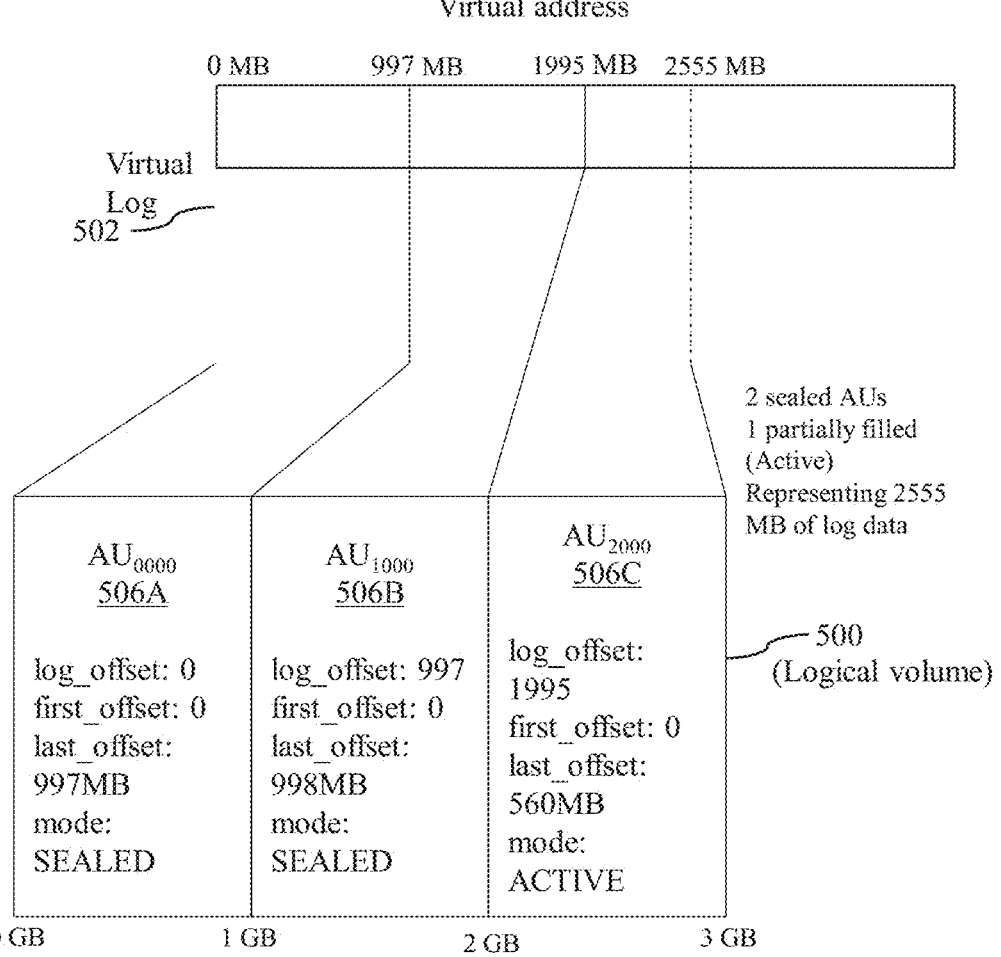
FIG. 5 is a schematic illustration of a state map that includes a state for each allocation unit to map an offset to an address in a storage array in accordance with an implementation of the disclosure.

FIG. 5 is a schematic illustration of a state map that includes a state for each allocation unit 506A-C to map an offset to an address in a storage array in accordance with an implementation of the disclosure. The allocation units 506A-C (e.g. $AU_{0000}$, $AU_{1000}$, and $AU_{2000}$) are allocated to a logical volume 500. Each allocation unit 506A-C (e.g. each 1 GB, in size) in the logic volume 500 has an independent state (e.g. 256 B, in size). A client device is configured to maintain the state map including the state for each allocation unit 506A-C allocated to the logical volume 500. The state includes a virtual offset of the allocation unit 506A-C within a virtual log 502 and a range of valid data in the allocation unit 506A-C. In an example, three allocation units (e.g. $AU_{0000}$, $AU_{1000}$, and $AU_{2000}$) 506A-C are allocated to the logical volume 500. The state of each allocation unit 506A-C may include a start offset of the allocation unit 506A-C in the virtual log (i.e. a log_logical_offset) 502, a first valid offset indicating a first valid byte if the allocation unit 506A-C is truncated (i.e. a first_valid_offset), a last valid offset indicating a last byte written to (a last_offset), and a mode of the allocation unit 506A-C. Optionally, the mode is one of uninitialized, active, sealing, sealed or deleted. Optionally, a size of each allocation unit 506A-C is 1 GB. Each allocation unit 506A-C may maintain a state of its own. The state of the allocation unit, $AU_{0000}$, is log_logical_offset: 0, the first_valid_offset: 0), the last_offset: 997 MB and the mode is sealed. The state of the allocation unit, $AU_{1000}$, is the log_logical_offset: 997, the first_valid_offset: 0, the last_offset: 998 MB and the mode is sealed. The state of the allocation unit, $AU_{2000}$, is the log_logical_offset: 1995, the first_valid_offset: 0, the last_offset: 560 MB and the mode is active. Optionally, the client device is further configured to read data from a virtual address in the virtual log 502 by (i) determining a logical volume address in the storage array for the virtual address in the virtual log 502, (ii) determining storage node address and a remote direct memory access, RDMA, address within the storage node corresponding to the logical volume address, and (iii) sending an RDMA read command to the RDMA address.

Optionally, the client device is further configured to determine the address in the storage array for the virtual address in the virtual log 502, by looking up the virtual offset for each allocation unit 506A-C in the state map, determining an offset for the virtual address within the allocation unit 506A-C and mapping the offset to an address in the storage array based on a client library.

Optionally, the client device is configured to append a payload to the virtual log 502 by (i) determining a current active allocation unit 506C from the state map, and (ii) sending an append request for the payload including the payload size to a near memory processing, NMP, module corresponding to the current active allocation unit 506C.

Figure 6:
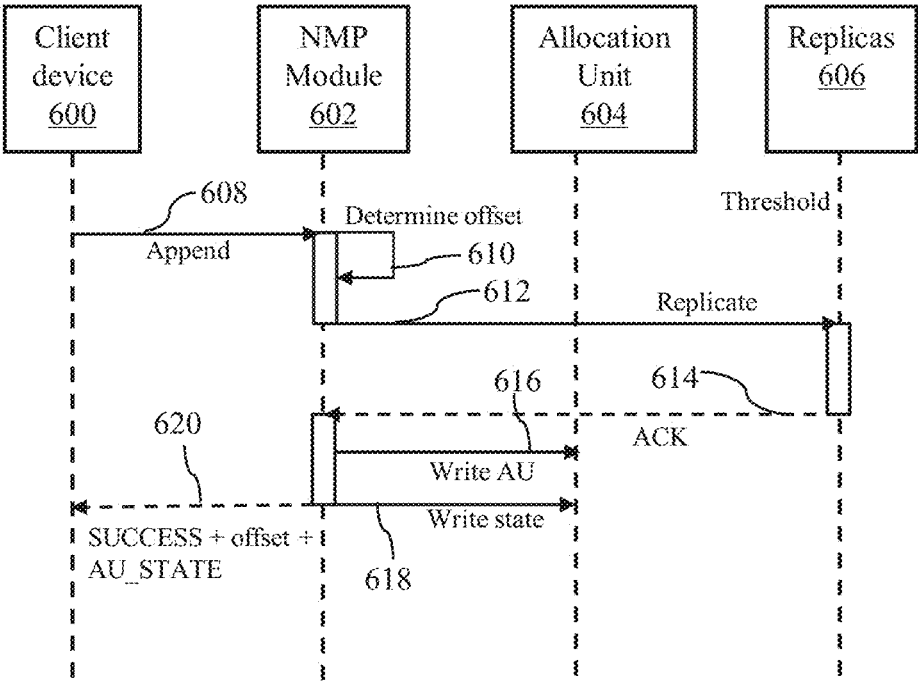
FIG. 6 is an interaction diagram that illustrates an append process for a small payload using a storage array in accordance with an implementation of the disclosure.

FIG. 6 is an interaction diagram that illustrates an append process for a small payload using a storage array in accordance with an implementation of the disclosure. The storage array includes a near memory processing, NMP, module 602 that is configured to respond to an append request received from one of one or more client devices (e.g. 600) by (i) determining an expected final write offset for the payload based on a state of an allocation unit 604 and a payload size, (ii) writing the payload to the allocation unit 604, (iii) updating the state of the respective allocation unit 604 in the reserved area of the allocation unit, and (iv) sending an updated state of the allocation unit 604 to the client device 600. Optionally, the NMP module is further configured to replicate the payload to one or more secondary data servers and wait for a confirmation of the replication before writing the payload to the allocation unit 604. In some examples, the NMP module may be configured to replicate an update payload representing one or more changes to be made by the received payload.

Optionally, the NMP module 602 is further configured to determine whether the payload size is small or large, based on a predetermined threshold. For a small payload, the expected final write offset is determined before the payload is replicated, and for a large payload, the payload is replicated before the final write offset is determined. In some examples, the NMP module 602 may be configured to determine the predetermined threshold dynamically based on, for example, an expected time to replicate to payload, or an expected number of smaller appends could be completed before complete replication of the payload (i.e. a number of appends that are blocked waiting for the payload. In some examples, the NMP module 602 may be configured to determine predetermined threshold based at least in part on a state of a replication queue between the 2 nodes, for example, even for a small payload it may be beneficial to wait before the final write offset is determined if there is a backlog, this may add to the time taken to append the payload, but can free up the backlog.

Optionally, the updated state of the allocation unit 604 includes the final write offset for the payload, and the NMP module 602 is configured to ensure that any data written up to the final write offset is valid before sending the updated state to the client device 600.

At a step 608, the client device 600 determines a current active state of an allocation unit 604 and sends an append request to the NMP module 602 of the storage array. At a step 610, the NMP module 602 determines an expected final write offset (i.e. using a command write_addr=last_offset.faa(size)) for the payload based on the state of the allocation unit 604 and the payload size. At a step 612, the NMP module 602 replicates (i.e. using a command replicate (write_addr, size, payload)) the payload to replicas (i.e. one or more secondary and tertiary data servers) 606, and wait for a confirmation of the replication before writing the payload to the allocation unit 604. At a step 614, the replicas 606 send an acknowledgment/confirmation of the replication to the NMP module 602. At a step 616, the NMP module 602 writes the payload to the allocation unit 604 in a persistent memory, PM (i.e. using a command PMEM.write(write_addr, size, payload)). At a step 618, the NMP module 602 updates the state of the respective allocation unit 604 in the reserved area of the allocation unit 604 and writes the state and the NMP module 602 waits for all previous writes to complete. At a step 620, on completion of the append request, the NMP module 602 sends an updated state (e.g. result, offset) of the allocation unit 604 to the client device 600.

The NMP module 602 may handle the small payloads (e.g. greater than or equal to 32 KB) differently from the large payloads in order to be efficient. Optionally, when replicating the small payloads, the replication time is fairly consistent, whereas when the payload size grows, the replication times may vary considerably, such that the replication of medium size payloads may finish sooner than larger payload even if started much later. The replicas 606 may be in parallel, so cost is the slowest replica. The number/size of the payload (e.g. 32 KB) may be determined based on an average time it takes to replicate specific payload sizes. Optionally, the different deployments/hardware have different values. The value may be dynamic, based on congestion, queue length, and other parameters, etc.

Optionally, an append process for a small payload without replication is provided. In this case, the NMP module 602 directly writes the payload to the allocation unit 604 in the persistent memory (i.e. using a command PMEM.write (write_addr, size, payload)) instead of replicating the payload to replicas 606.

Figure 7:
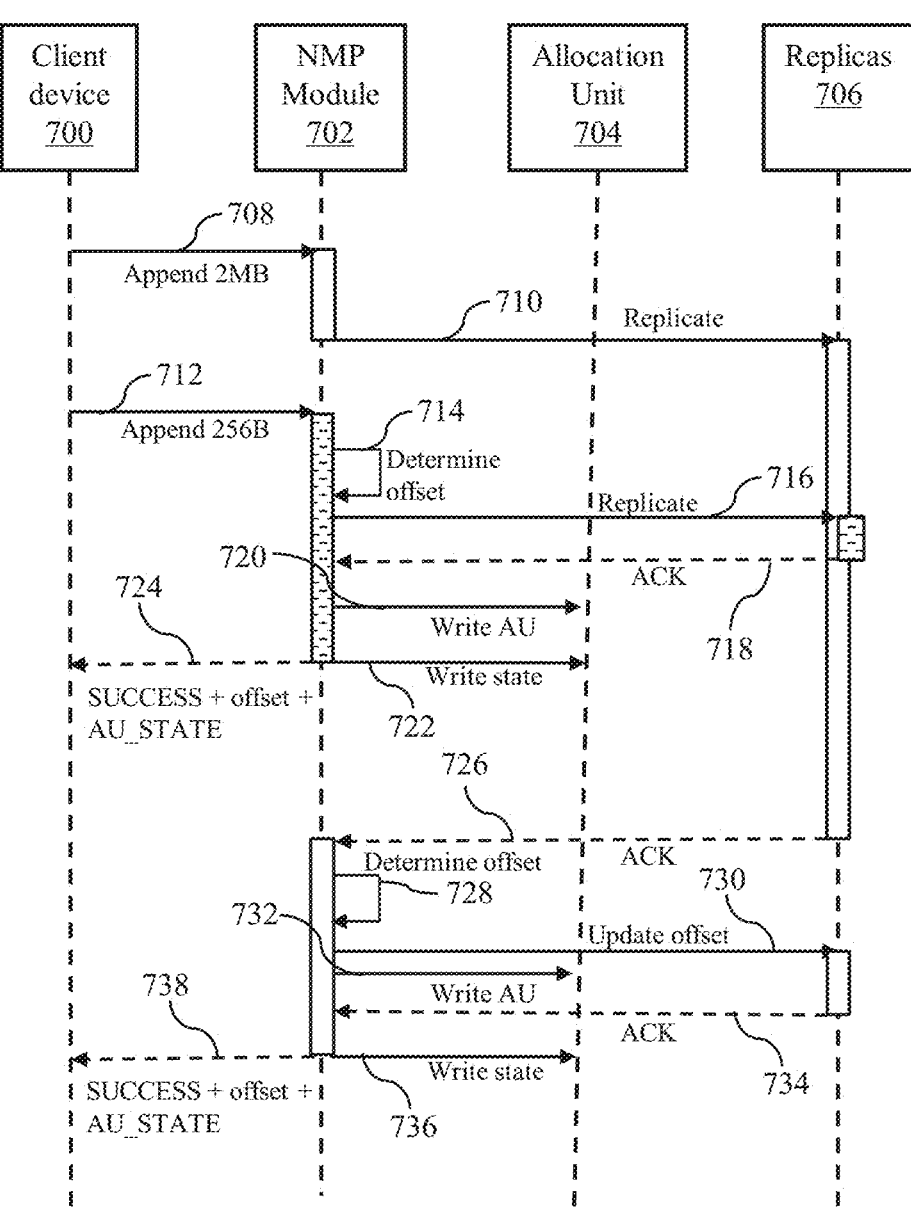
FIG. 7 is an interaction diagram that illustrates an append process for a large payload using a storage array in accordance with an implementation of the disclosure.

FIG. 7 is an interaction diagram that illustrates an append process for a large payload using a storage array in accordance with an implementation of the disclosure. For a large payload, the payload is replicated before the final write offset (i.e. final address) is determined. Hence, a near memory processing. NMP, module 702 of the storage array is configured to replicate without a final write offset, wait for the replication to finish, determine the final write offset, and then update the replicas. For example, if a client device (e.g. 700) sends 2 MB append followed by 256 B append, then the 256 B payload is stored before the 2 MB payload as it is replicated well before the 2 MB and the NMP module need not wait for 2 MB to finish replicating. Even, if the 2 MB append is followed by 1 MB append, it follows the large replication path, and the 1 MB payload finish before, and its final address may be determined before the 2 MB payload.

At a step 708, the client device 700 determines a current active state of an allocation unit 704 and sends an append request to the NMP module 702 of the storage array. A size of the append data may be 2 MB (i.e. a small payload). At a step 710, the NMP module 702 replicates (i.e. using a command replicate (write_addr, size, payload)) the payload to replicas 706 (i.e. one or more secondary and tertiary data servers), and wait for a confirmation of the replication before writing the payload to the allocation unit 704.

At a step 712, the client device 700 determines a current active state of an allocation unit 704 and sends an append request to the NMP module 702 of the storage array. A size of the append data may be 256 MB (i.e. a large payload). At a step 714, the NMP module 702 determines an expected final write offset (i.e. using a command write_addr=last_offset.faa(size)) for the payload based on the allocation unit state and the payload size. At a step 716, the NMP module 702 replicates (i.e. using a command replicate (write_addr, size, payload)) the payload to replicas 706 (i.e. one or more secondary and tertiary data servers), and wait for a confirmation of the replication before writing the payload to the allocation unit 704. At a step 718, the replicas 706 sends an acknowledgment/confirmation to the NMP module 702. At a step 720, the NMP module 702 writes the payload to the allocation unit 704 in a persistent memory. PM, (i.e. using a command PMEM.write (write_addr, size, payload)). At a step 722, the NMP module 702 writes the state, and the NMP module 702 waits for all previous writes to complete. At a step 724, on a completion of the append request, the NMP module 702 updates the state of the respective allocation unit 704 in the reserved area of the allocation unit 704 and sends an updated state (i.e. result, offset) of the allocation unit 704 to the client device 700.

At a step 726, the replicas 706 sends an acknowledgment to the NMP module 702 regarding the payload size of 2 MB. At a step 728, the NMP module 702 determines an expected final write offset (i.e. using a command write_addr=last_offset.faa(size)) for the payload based on the allocation unit state and the payload size. At a step 730, the NMP module 702 updates the state of the respective allocation unit 704 in the reserved area of the allocation unit 704 and waits for a confirmation before updating a state of the allocation unit 704. At a step 732, the NMP module 702 writes the payload to the allocation unit 704 in the persistent memory, PM (i.e. using the command PMEM.write (write_addr, size, payload)). At a step 734, the replicas 706 sends an acknowledgment to the NMP module 702. At a step 736, the NMP module 702 writes the state and the NMP module 702 waits for all previous writes to complete. At a step 738, on a completion of the append request, the NMP module 702 sends an updated state (result, offset) of the allocation unit 704 to the client device 700.

FIG. 8 is a flow diagram that illustrates a method of operating a centralized logging storage array in accordance with an implementation of the disclosure. The centralized logging storage array includes one or more servers configured to host one or more allocation units allocated to a logical volume, and a near memory processing. NMP, module associated with one or more of the allocation units. At a step 802, a state of the respective allocation unit in a reserved area of the allocation unit is recorded and updated, by the NMP module for each allocation unit. The state includes a virtual offset of the allocation unit within a virtual log and a range of valid data in the allocation unit. At a step 804, the allocation unit state is returned, by the NMP module, in response to a command from one of one or more client devices.

The method provides an improved performance of 30 μs for a write for an IO of 4 to 8 KB with replica. The method provides an improved performance of 6 μs for a read for an IO of 64 KB. The storage array has a storage efficiency of up to 99.8%. The method distributes the state that is shared in the allocation units and eliminates the need for replication, thereby simplifying the management of logs and error recovery.

Optionally, updating the state of the respective allocation unit in the reserved area includes using a cache line aligned write operation. Optionally, the state of each allocation unit includes a start offset of the allocation unit in the virtual log, a first valid offset indicating a first valid byte if the allocation unit is truncated, a last valid offset indicating a last byte written to, and a mode of the allocation unit. Optionally, the mode is one of uninitialized, active, sealing, sealed or deleted.

Optionally, the method further includes responding, by the NMP module, to an append request received from one of the one or more client devices by: (i) determining an expected final write offset for the payload based on the allocation unit state and a payload size; (ii) writing the payload to the allocation unit; (iii) updating the state of the respective allocation unit in the reserved area of the allocation unit; and (iv) sending an updated state of the allocation unit to the client device.

Optionally, the method further includes replicating, by the NMP module, the payload to one or more secondary data servers, and waiting for a confirmation of the replication before writing the payload to the allocation unit.

Optionally, the method further includes determining, by the NMP module, whether the payload size is small or large, based on a predetermined threshold. For a small payload the expected final write offset is determined before the payload is replicated, and for a large payload the payload is replicated before the final write offset is determined.

The updated state of the allocation unit may include the final write offset for the payload. The method further includes ensuring, by the NMP module, that any data written up to the final write offset is valid before sending the updated state to the client device.

Optionally, the method further includes maintaining, by a client device arranged to communicate with the centralized logging storage array, a state map including the state for each allocation unit allocated to the logical volume.

Optionally, the method further includes maintaining, by the client device, a client library including a logical volume address in the storage array for each allocation unit, a storage node address corresponding to the allocation unit, and a corresponding RDMA address within the storage node.

Optionally, the method further includes reading, by the client device, data from a virtual address in the virtual log by: (i) determining a logical volume address in the storage array for the virtual address in the virtual log; (ii) determining a storage node address and a RDMA address within the storage node corresponding to the logical volume address; and (iii) sending an RDMA read command to the RDMA address.

Optionally, the method further includes determining, by the client device, the address in the storage array for the virtual address in the virtual log, by looking up the virtual offset for each allocation unit in the state map, determining an offset for the virtual address within the allocation unit and mapping the offset to an address in the storage array based on the client library.

Optionally, the method further includes appending, by the client device, a payload to the virtual log by: (i) determining a current active allocation unit from the state map; and (ii) sending an append request for the payload including the payload size to the NMP module corresponding to the current active allocation unit.

In an implementation, the disclosure provides a computer-readable medium comprising instructions which, when executed by a processor, cause the processor to perform the above method.

Figure 9:
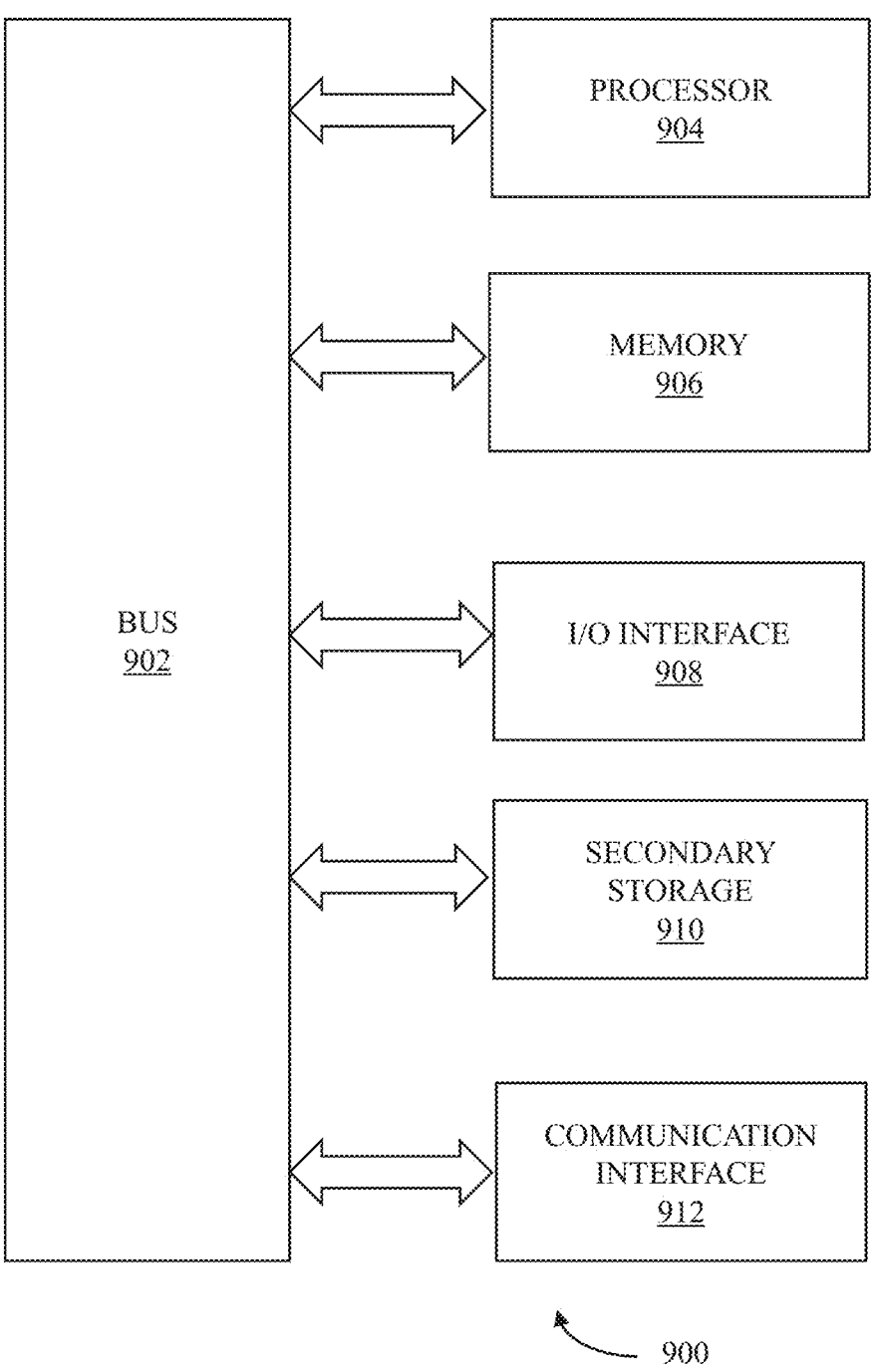
FIG. 9 is an illustration of a computer system (e.g. a client device) in which the various architectures and functionalities of the various previous implementations may be implemented.

FIG. 9 is an illustration of a computer system (e.g. a client device, a storage array, a server, a near memory processing. NMP, module) in which the various architectures and functionalities of the various previous implementations may be implemented. As shown, the computer system 900 includes at least one processor 904 that is connected to a bus 902, wherein the computer system 900 may be implemented using any suitable protocol, such as PCI (Peripheral Component Interconnect), PCI-Express, AGP (Accelerated Graphics Port), Hyper Transport, or any other bus or point-to-point communication protocol(s). The computer system 900 also includes a memory 906.

Control logic (software) and data are stored in the memory 906 which may take a form of random-access memory (RAM). In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 900 may also include a secondary storage 910. The secondary storage 910 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 906 and the secondary storage 910. Such computer programs, when executed, enable the computer system 900 to perform various functions as described in the foregoing. The memory 906, the secondary storage 910, and any other storage are possible examples of computer-readable media.

In an implementation, the architectures and functionalities depicted in the various previous figures may be implemented in the context of the processor 904, a graphics processor coupled to a communication interface 912, an integrated circuit (not shown) that is capable of at least a portion of the capabilities of both the processor 904 and a graphics processor, a chipset (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 900 may take the form of a desktop computer, a laptop computer, a server, a workstation, a game console, an embedded system.

Furthermore, the computer system 900 may take the form of various other devices including, but not limited to a personal digital assistant (PDA) device, a mobile phone device, a smart phone, a television, and so forth. Additionally, although not shown, the computer system 900 may be coupled to a network (for example, a telecommunications network, a local area network (LAN), a wireless network, a wide area network (WAN) such as the Internet, a peer-to-peer network, a cable network, or the like) for communication purposes through an I/O interface 908.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A storage array for centralized logging, the storage array comprising:
   a plurality of servers configured to host a plurality of allocation units allocated to a logical volume; and
   a near memory processing module for a respective allocation unit, the NMP module being configured to record and update an allocation unit state of the respective allocation unit in a reserved area of the respective allocation unit,
   wherein the allocation unit state includes a virtual offset of the respective allocation unit within a virtual log and a range of valid data in the respective allocation unit, and
   wherein the NMP module is configured to return the allocation unit state of the respective allocation unit in response to a command from one of a plurality of client devices.

2. The storage array of claim 1, wherein the NMP module is configured to update the state of the respective allocation unit in the reserved area using a cache line aligned write operation.

3. The storage array of claim 1, wherein the allocation unit state includes a start offset of the respective allocation unit in the virtual log, a first valid offset indicating a first valid byte if the respective allocation unit is truncated, a last valid offset indicating a last byte written to, and a mode of the respective allocation unit.

4. The storage array of claim 3, wherein the mode of the respective allocation unit is uninitialized, active, sealing, sealed or deleted.

5. The storage array of claim 1, wherein the NMP module is configured to respond to an append request received from one of the plurality of client devices by:
   determining an expected final write offset for a payload based on the allocation unit state and a payload size;
   writing the payload to the respective allocation unit;
   updating the allocation unit state of the respective allocation unit in the reserved area of the respective allocation unit; and
   sending an updated allocation unit state of the respective allocation unit to the client device.

6. The storage array of claim 5, wherein the NMP module is further configured to replicate the payload to one or more secondary data servers, and wait for a confirmation of the replication before writing the payload to the respective allocation unit.

7. The storage array of claim 5, wherein the NMP module is further configured to determine whether the payload size is small or large, based on a predetermined threshold;
   Wherein, for a small payload, the expected final write offset is determined before the payload is replicated, and, for a large payload, the payload is replicated before the final write offset is determined.

8. The storage array of claim 5, wherein the updated allocation unit state of the respective allocation unit includes the final write offset for the payload, and the NMP module is configured to ensure that any data written up to the final write offset is valid before sending the updated state to the client device.

9. A client device configured to communicate with a centralized logging storage array that includes a plurality of servers configured to host a plurality of allocation units allocated to a logical volume, the client device comprising:
   processing circuitry configured to maintain a state map including an allocation unit state for one or more allocation units allocated to the logical volume, wherein the allocation unit state of a respective allocation unit includes a virtual offset of the respective allocation unit within a virtual log and a range of valid data in the respective allocation unit.

10. The client device of claim 9, wherein the processing circuitry is further configured to maintain a client library including a logical volume address in the storage array for each of the one or more allocation units, a storage node address corresponding to a respective allocation unit, and a corresponding Remote Direct Memory Access address within the storage node.

11. The client device of claim 10, wherein the processing circuitry is further configured to read data from a virtual address in the virtual log by:
   determining a logical volume address in the storage array for the virtual address in the virtual log;
   determining a storage node address and an RDMA address within the storage node corresponding to the logical volume address; and
   sending an RDMA read command to the RDMA address.

12. The client device of claim 11, wherein the processing circuitry is further configured to determine the address in the storage array for the virtual address in the virtual log, by looking up the virtual offset for each allocation unit in the state map, determining an offset for the virtual address within the allocation unit and mapping the offset to an address in the storage array based on the client library.

13. The client device of claim 9, wherein the processing circuitry is configured to append a payload to the virtual log by:
   determining a current active allocation unit from the state map; and
   sending an append request for the payload including a payload size to a near memory processing module corresponding to the current active allocation unit.

14. A method of operating a centralized logging storage array that includes a plurality of servers configured to host a plurality of allocation units allocated to a logical volume, and a near memory processing module associated with a respective allocation unit of the plurality of allocation units, the method comprising:
   recording and updating, by the NMP module for the respective allocation unit, an allocation unit state of the respective allocation unit in a reserved area of the respective allocation unit, wherein the allocation unit state includes a virtual offset of the respective allocation unit within a virtual log and a range of valid data in the respective allocation unit; and returning, by the NMP module, the allocation unit state in response to a command from one of a plurality of client devices.

15. The method of claim 14, wherein updating the allocation unit state of the respective allocation unit in the reserved area includes using a cache line aligned write operation.

16. The method of claim 14, wherein the allocation unit state of the respective allocation unit includes a start offset of the respective allocation unit in the virtual log, a first valid offset indicating a first valid byte if the respective allocation unit is truncated, a last valid offset indicating a last byte written to, and a mode of the respective allocation unit.

17. The method of claim 16, wherein the mode is uninitialized, active, sealing, sealed, or deleted.

18. The method of claim 14, further comprising responding, by the NMP module, to an append request received from one of the plurality of client devices by:

determining an expected final write offset for a payload based on the allocation unit state and a payload size;

writing the payload to the respective allocation unit;

updating the allocation unit state of the respective allocation unit in the reserved area of the respective allocation unit; and sending an updated state of the respective allocation unit to the client device.

19. The method of claim 18, further comprising replicating, by the NMP module, the payload to one or more secondary data servers, and waiting for a confirmation of the replication before writing the payload to the respective allocation unit.

20. The method of claim 18, further comprising determining, by the NMP module, whether the payload size is small or large, based on a predetermined threshold;

wherein, for a small payload, the expected final write offset is determined before the payload is replicated, and, for a large payload, the payload is replicated before the final write offset is determined.

21. The method of claim 18, wherein the updated state of the respective allocation unit includes the final write offset for the payload, the method further comprising ensuring, by the NMP module, that any data written up to the final write offset is valid before sending the updated state to the client device.

22. The method of claim 14, further comprising maintaining, by a client device arranged to communicate with the centralized logging storage array, a state map including the state for each allocation unit allocated to the logical volume.

23. The method of claim 22, further comprising maintaining, by the client device, a client library including a logical volume address in the storage array for each respective allocation unit allocated to the logical volume, a storage node address corresponding to the respective allocation unit, and a corresponding Remote Direct Memory Access address within the storage node.

24. The method of claim 23, further comprising reading, by the client device, data from a virtual address in the virtual log by:

determining a logical volume address in the storage array for the virtual address in the virtual log;

determining a storage node address and an RDMA address within the storage node corresponding to the logical volume address; and sending an RDMA read command to the RDMA address.

25. The method of claim 24, further comprising determining, by the client device, the address in the storage array for the virtual address in the virtual log, by looking up the virtual offset for each allocation unit in the state map, determining an offset for the virtual address within the allocation unit and mapping the offset to an address in the storage array based on the client library.

26. The method of claim 22, further comprising appending, by the client device, a payload to the virtual log by:

determining a current active allocation unit from the state map; and sending an append request for the payload including the payload size to the NMP module corresponding to the current active allocation unit.

27. A non-transitory computer-readable medium having stored thereon instructions that, when executed by a processor, cause the processor to perform the method of claim 14.

* * * * *